United States Patent
Fukui

(10) Patent No.: US 9,146,698 B2
(45) Date of Patent: Sep. 29, 2015

(54) PRINT MANAGEMENT APPARATUS, NON-TRANSITORY COMPUTER READABLE MEDIUM, AND PRINTING SYSTEM

(71) Applicant: FUJI XEROX CO., LTD., Minato-ku, Tokyo (JP)

(72) Inventor: Takeshi Fukui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/257,691

(22) Filed: Apr. 21, 2014

(65) Prior Publication Data

US 2015/0092217 A1    Apr. 2, 2015

(30) Foreign Application Priority Data

Oct. 2, 2013 (JP) ................. 2013-207577
Oct. 4, 2013 (JP) ................. 2013-208862

(51) Int. Cl.
*G06K 15/00* (2006.01)
*G06F 3/12* (2006.01)

(52) U.S. Cl.
CPC ............. *G06F 3/121* (2013.01); *G06F 3/126* (2013.01); *G06F 3/1211* (2013.01); *G06F 3/1261* (2013.01)

(58) Field of Classification Search
USPC ........ 358/1.15, 400, 402, 401, 405, 434, 435, 358/442, 436, 437, 440, 439, 1.14, 1.18
See application file for complete search history.

(56) References Cited

U.S. PATENT DOCUMENTS

| | | | |
|---|---|---|---|
| 4,994,926 A * | 2/1991 | Gordon et al. | ................. 358/400 |
| 5,126,786 A | 6/1992 | Tanaka | |
| 5,625,757 A | 4/1997 | Kageyama et al. | |
| 2002/0048476 A1 | 4/2002 | Kato | |
| 2004/0184061 A1 * | 9/2004 | Christiansen | ................. 358/1.13 |
| 2004/0190042 A1 | 9/2004 | Ferlitsch et al. | |
| 2005/0213144 A1 | 9/2005 | Uejo | |

(Continued)

FOREIGN PATENT DOCUMENTS

| JP | 02-120066 A | 5/1990 |
|---|---|---|
| JP | 08-221233 A | 8/1996 |
| JP | 2004-192507 A | 7/2004 |

(Continued)

OTHER PUBLICATIONS

Office Action (Patent Examination Report) dated Apr. 1, 2015, issued by the Australian Patent Office in counterpart Australian Application No. 2014202960.

*Primary Examiner* — Jerome Grant, II
(74) *Attorney, Agent, or Firm* — Sughrue Mion, PLLC

(57) ABSTRACT

Provided is a printing management apparatus including an assignment unit that assigns portions to be interpreted among respective pieces of print data, to plural interpreters that interpret print data, so as to be interpreted, a failure detector that detects a failure of the interpreters, and a reassignment unit that reassigns portions, among the print data, assigned to a failed interpreter which is detected by the failure detector to a remaining interpreter other than the failed interpreter, among the plural interpreters, so as to be interpreted, wherein the plural interpreters transmit interpretation result data obtained by interpreting the portions assigned by the assignment unit to one printing control apparatus, and the printing control apparatus causes a printing apparatus to perform printing in accordance with the interpretation result data corresponding to each portion of the print data which is received from the plural interpreters.

12 Claims, 15 Drawing Sheets

(56) References Cited

U.S. PATENT DOCUMENTS

2011/0075165 A1 3/2011 Hayakawa
2013/0070294 A1 3/2013 Mochizuki

FOREIGN PATENT DOCUMENTS

| JP | 2009-026231 A | 2/2009 |
| JP | 2011-070337 A | 4/2011 |

* cited by examiner

FIG. 3

| APPARATUS ID | APPARATUS TYPE | ADDRESS FOR COMMUNICATION |
|---|---|---|
| D001 | MANAGEMENT APPARATUS | 192.168.0.1 |
| D002 | INTERPRETER | 192.168.0.2 |
| D003 | PRINTING CONTROL APPARATUS | 192.168.0.3 |
| D004 | INTERPRETER | 192.168.0.4 |
| D005 | INTERPRETER | 192.168.0.5 |
| D006 | MANAGEMENT APPARATUS | 192.168.0.6 |
| D007 | INTERPRETER | 192.168.0.7 |
|  |  |  |

FIG. 4

| SYSTEM ID | MANAGEMENT APPARATUS | INTERPRETER | PRINTING CONTROL APPARATUS |
|---|---|---|---|
| S01 | D001 | D002, D004, D005 | D003 |
| S02 | D006 | D007, D008, .... | D011, D012 |
| S03 | D020 | D021 | D022 |
|  |  |  |  |

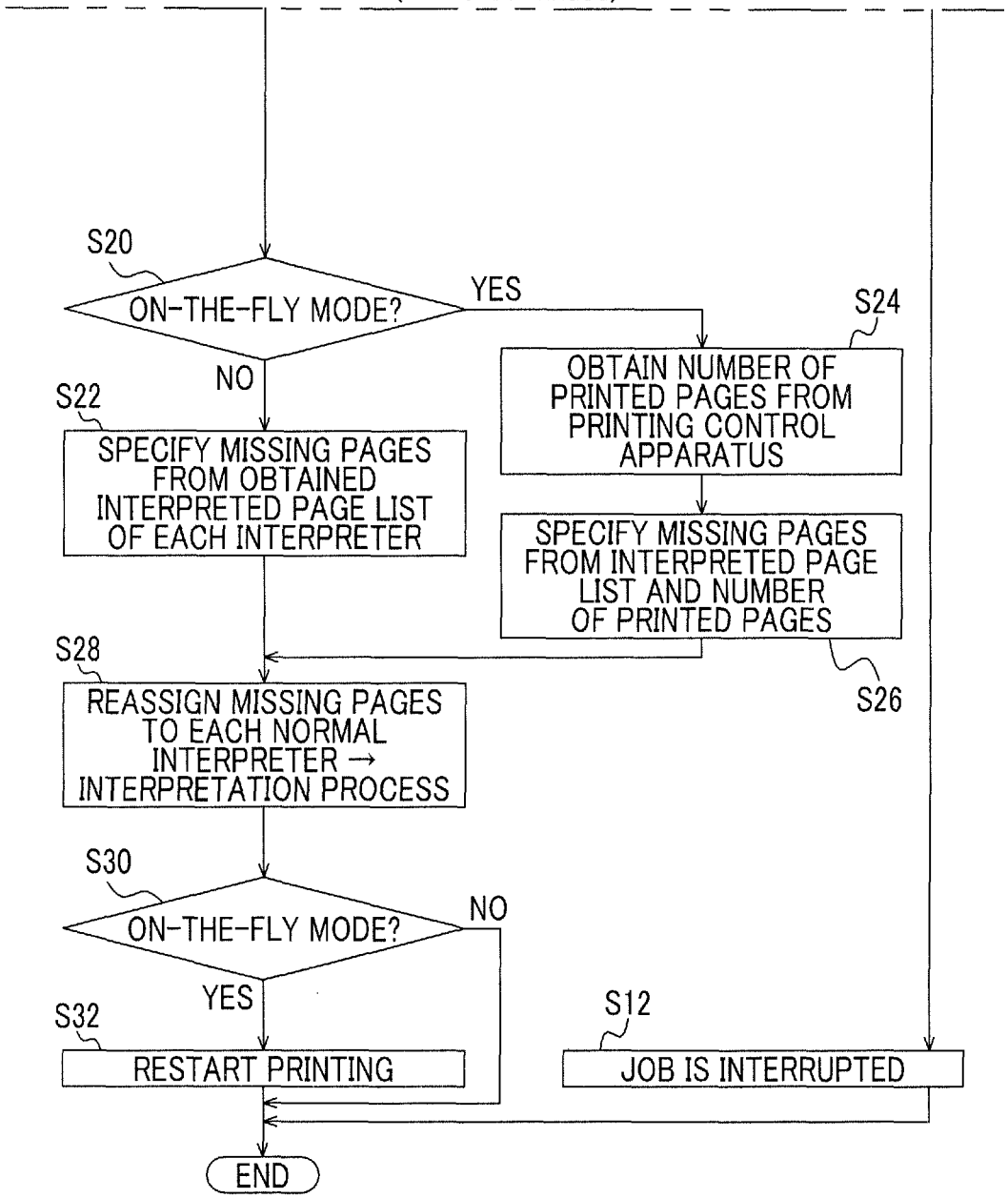

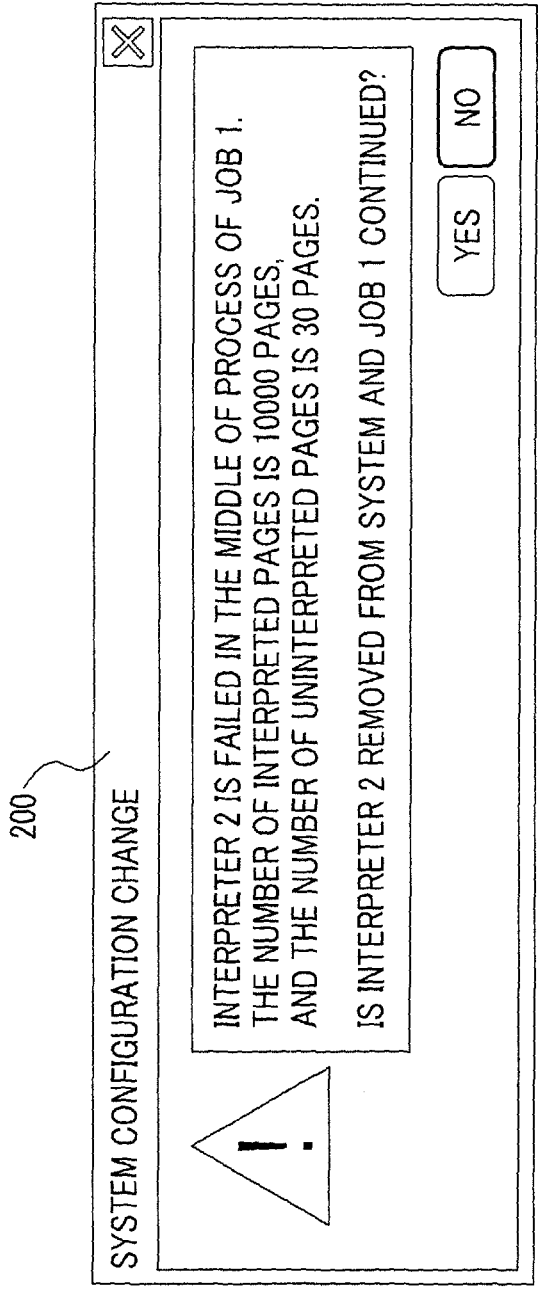

FIG. 13
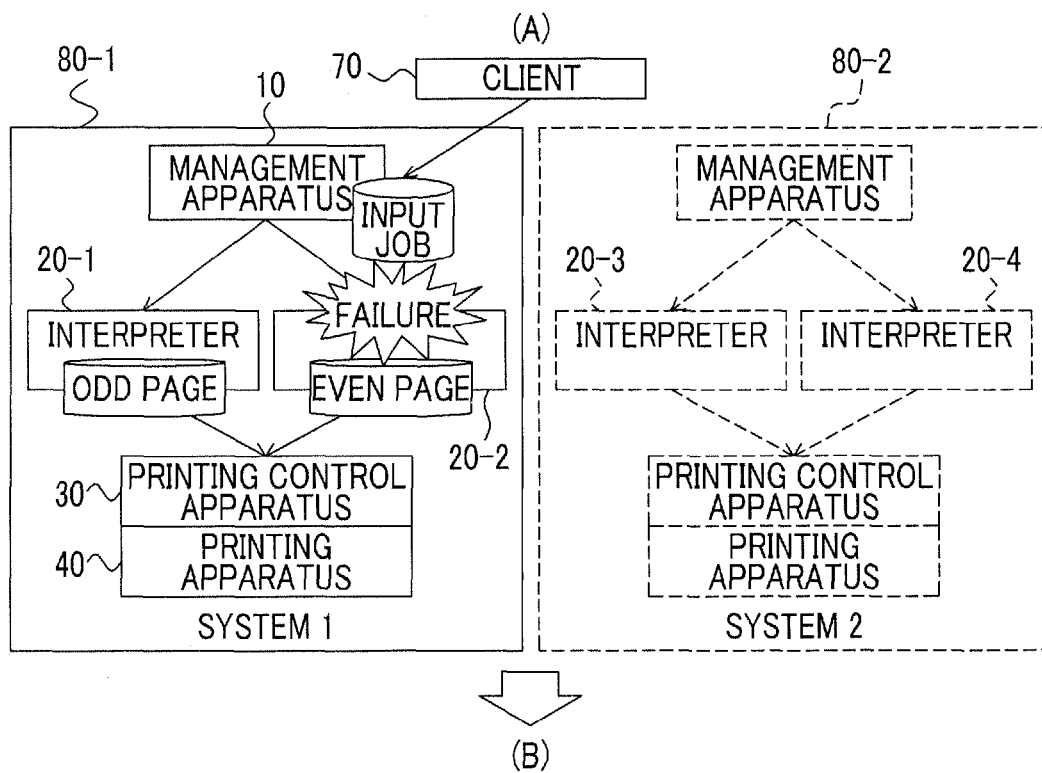
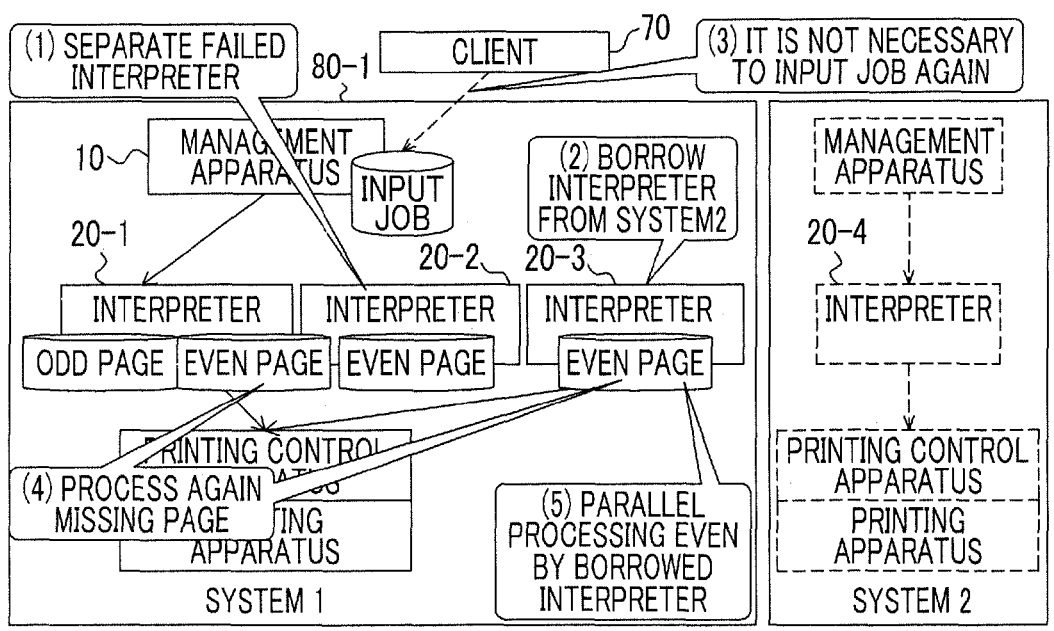

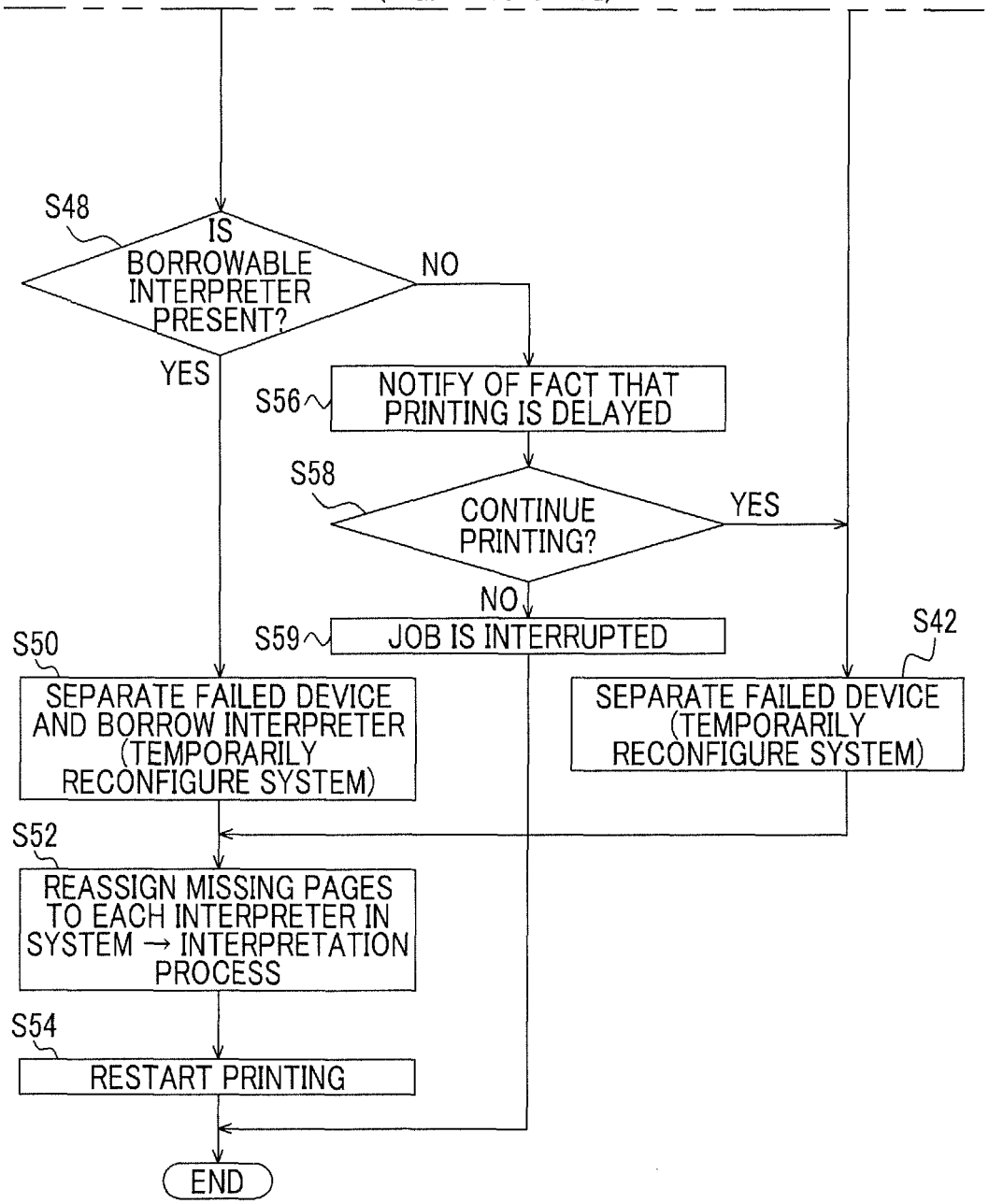

PRINT MANAGEMENT APPARATUS, NON-TRANSITORY COMPUTER READABLE MEDIUM, AND PRINTING SYSTEM

CROSS-REFERENCE TO RELATED APPLICATIONS

This application is based on and claims priority under 35 USC 119 from Japanese Patent Application Nos. 2013-207577 filed Oct. 2, 2013 and 2013-208862 filed Oct. 4, 2013.

BACKGROUND

Technical Field

The present invention relates to a print management apparatus, a non-transitory computer readable medium, and a printing system.

SUMMARY

According to an aspect of the invention, there is provided a printing management apparatus including:

an assignment unit that assigns portions to be interpreted among respective pieces of print data, to plural interpreters that interpret print data, so as to be interpreted;

a failure detector that detects a failure of the interpreters; and a reassignment unit that reassigns portions, among the print data, assigned to a failed interpreter which is detected by the failure detector to a remaining interpreter other than the failed interpreter, among the plural interpreters, so as to be interpreted, wherein the plural interpreters transmit interpretation result data obtained by interpreting the portions assigned by the assignment unit to one printing control apparatus, and the printing control apparatus causes a printing apparatus to perform printing in accordance with the interpretation result data corresponding to each portion of the print data which is received from the plural interpreters.

BRIEF DESCRIPTION OF THE DRAWINGS

Exemplary embodiments of the present invention will be described in detail based on the following figures, wherein:

FIG. 3 is a diagram describing an example of data contents of apparatus management information;

FIG. 4 is a diagram describing an example of data contents of printing system management information;

Figure 5:
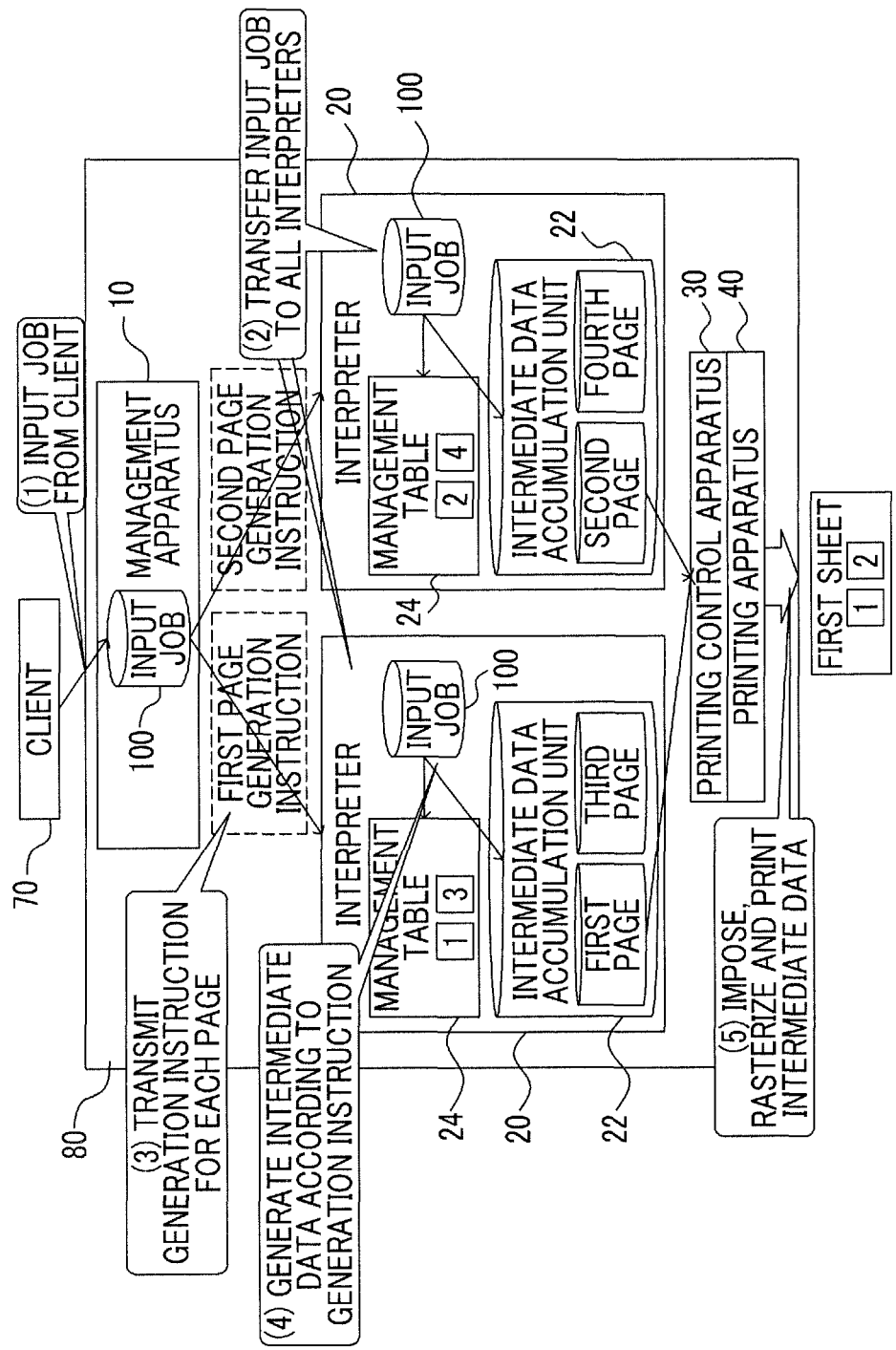
FIG. 5 is a diagram describing a flow of a normal print process in the printing system to which the control of the exemplary embodiment is applied.
Figure 6:
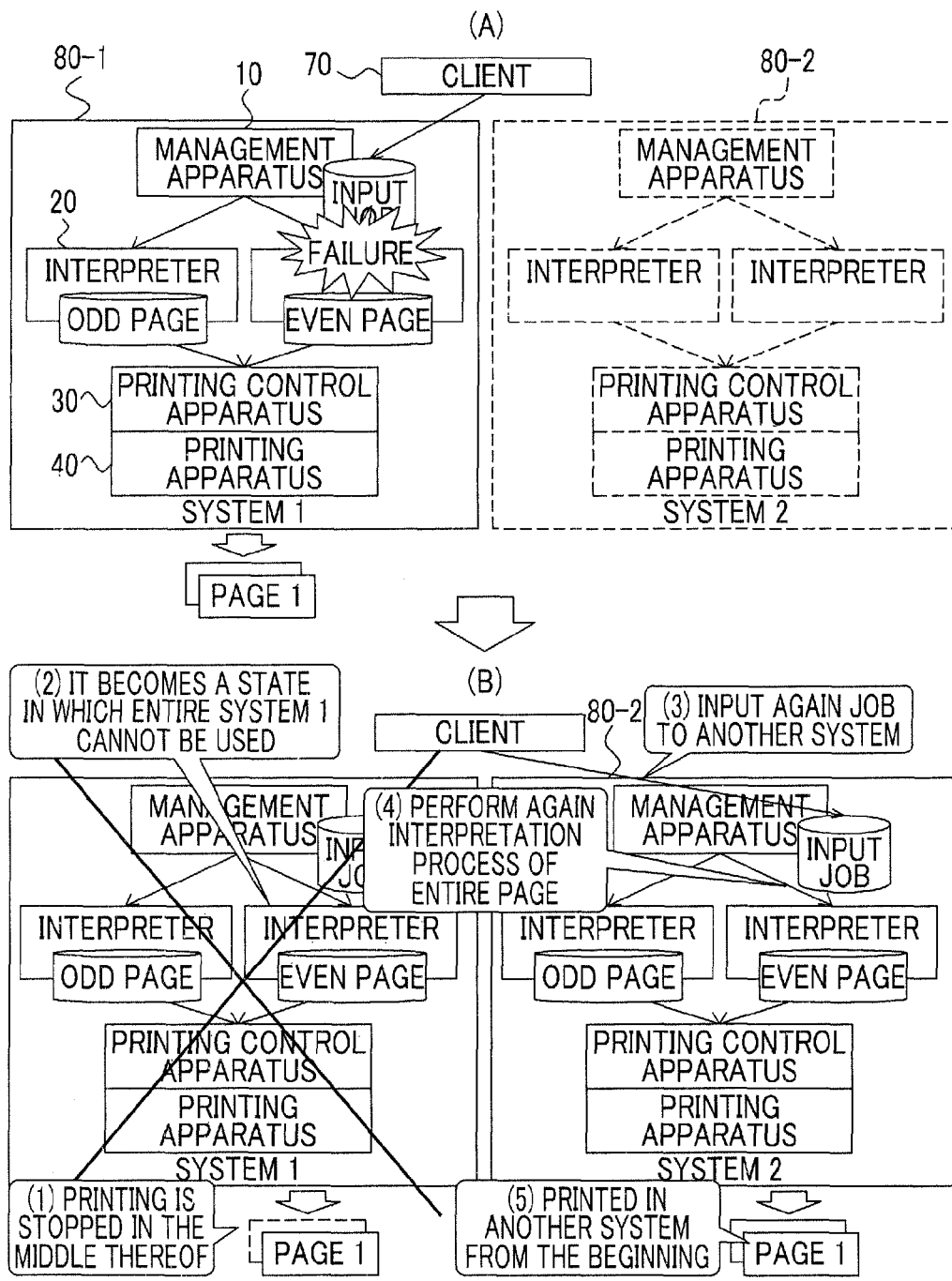
Figure 7:
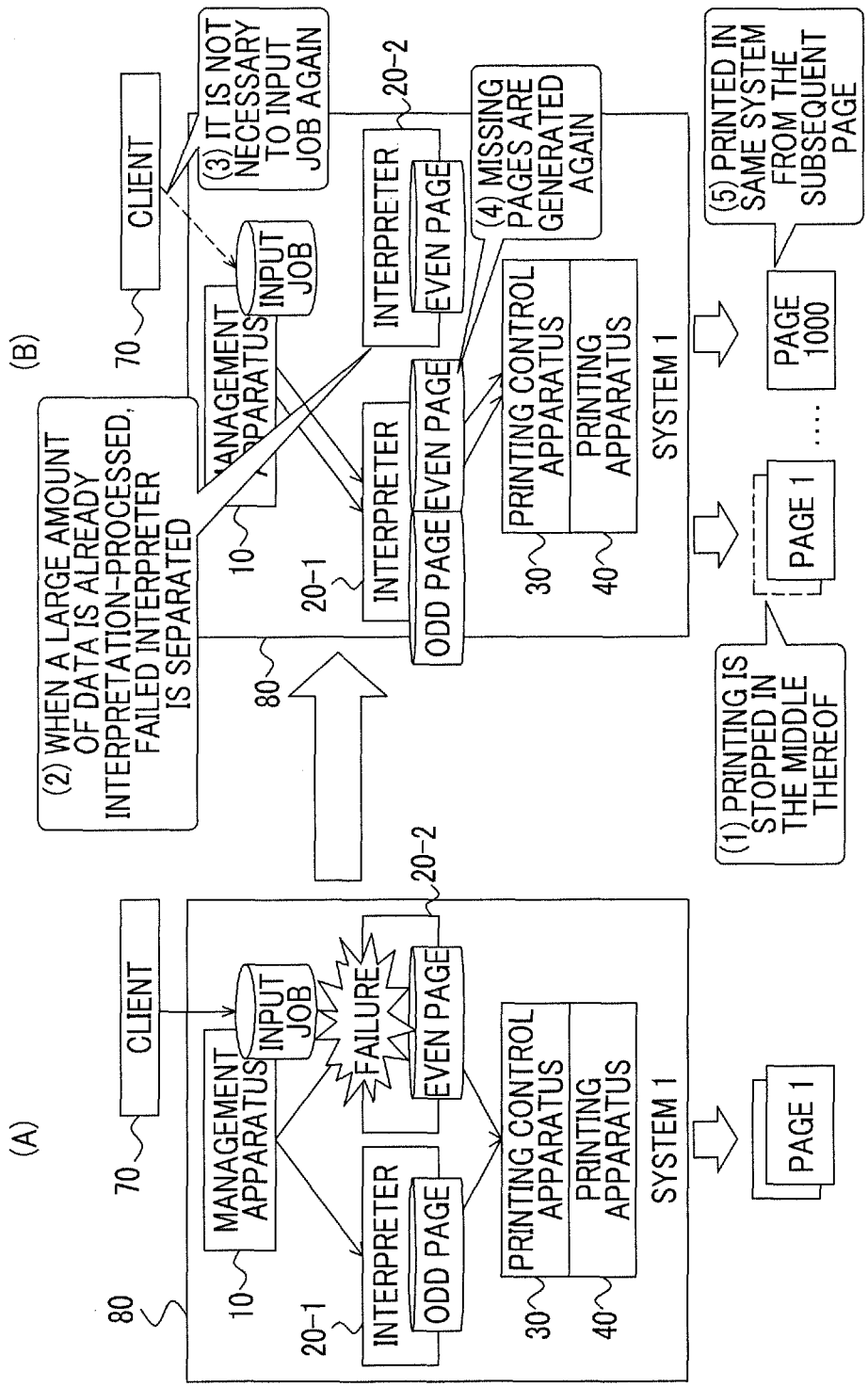
Figure 8:
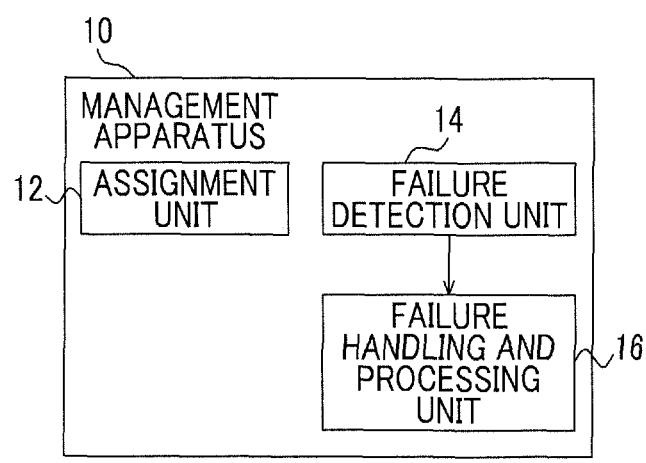
Figure 9:
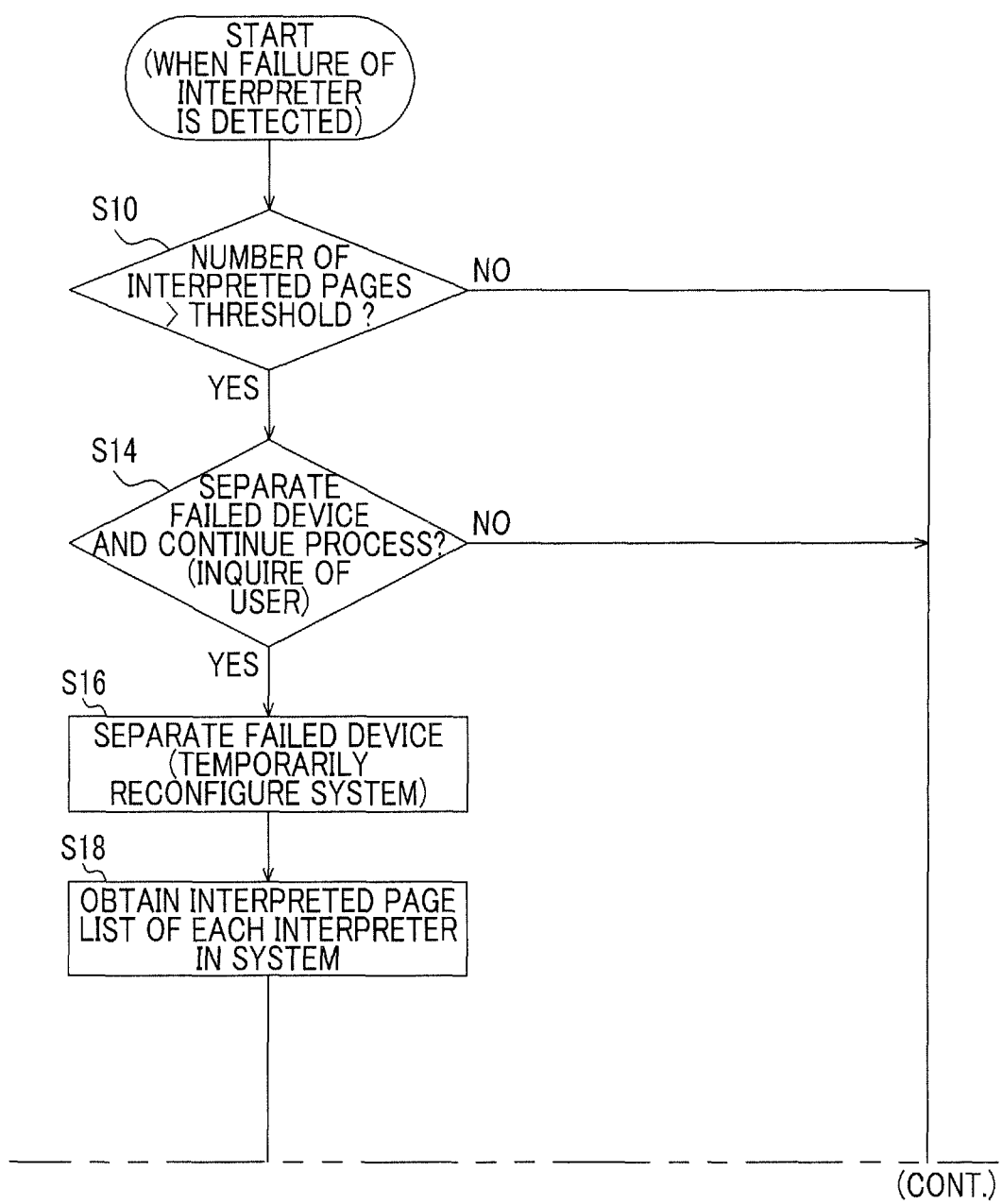
Figure 11:
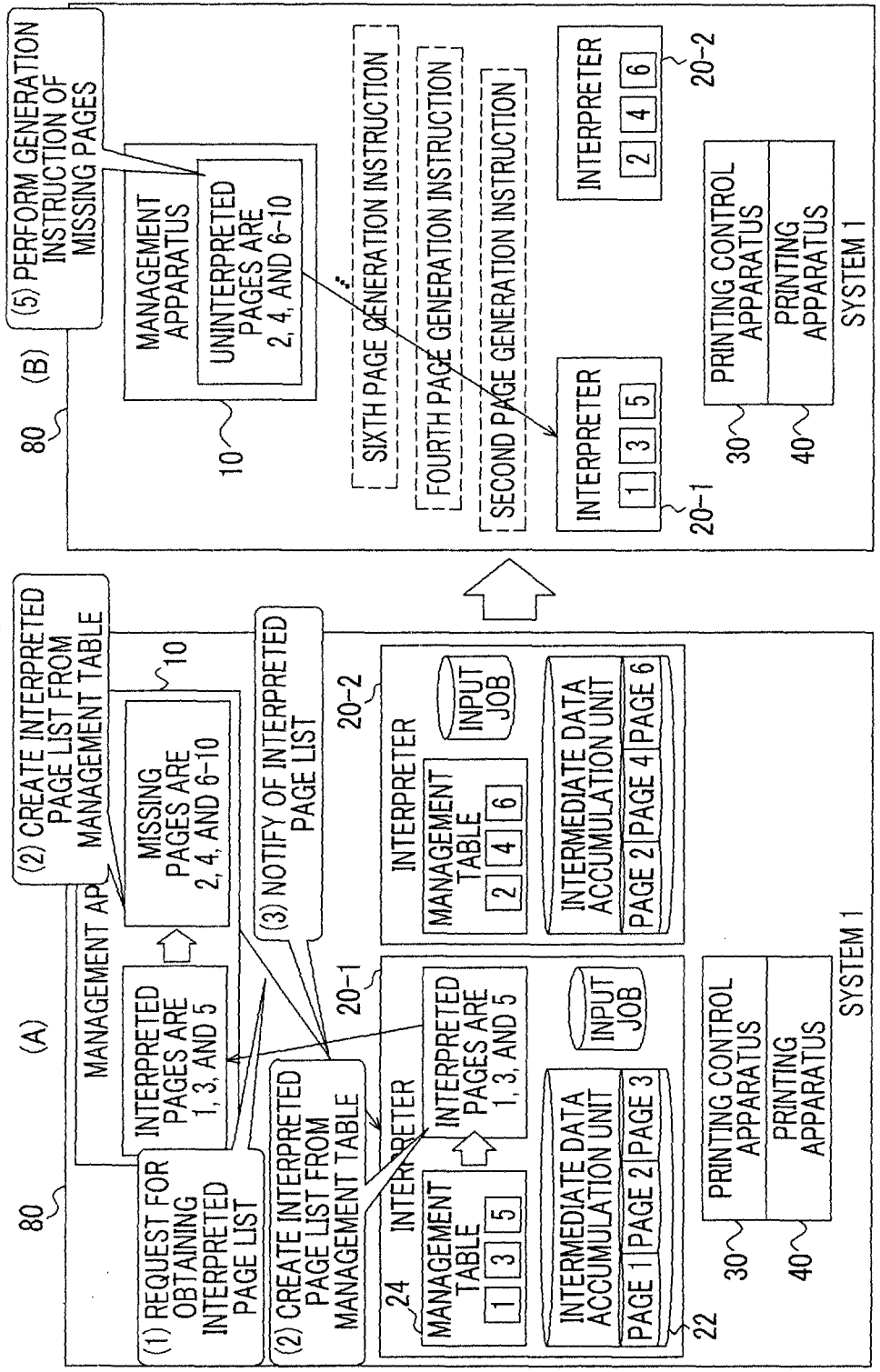
Figure 12:
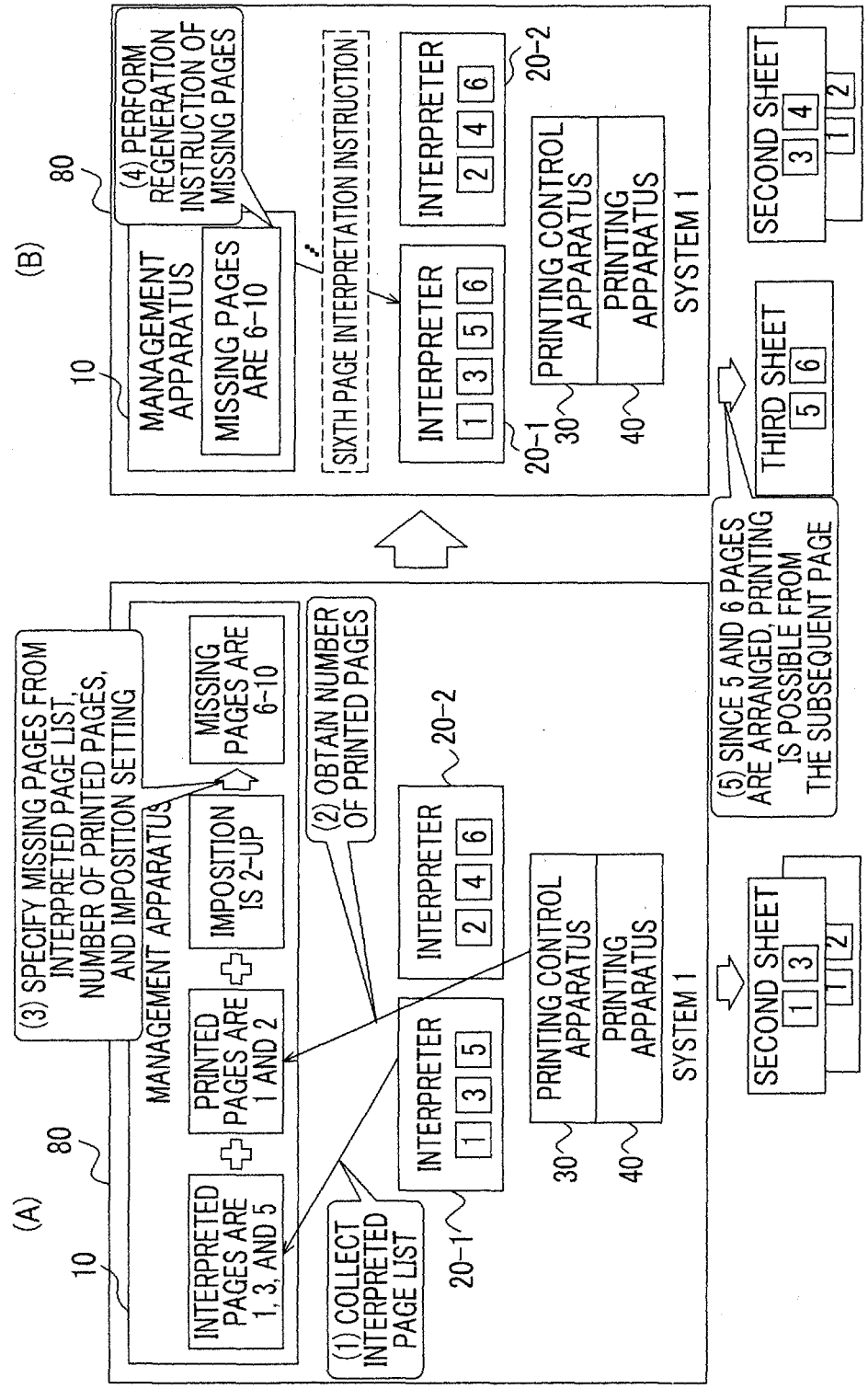
Figure 14:
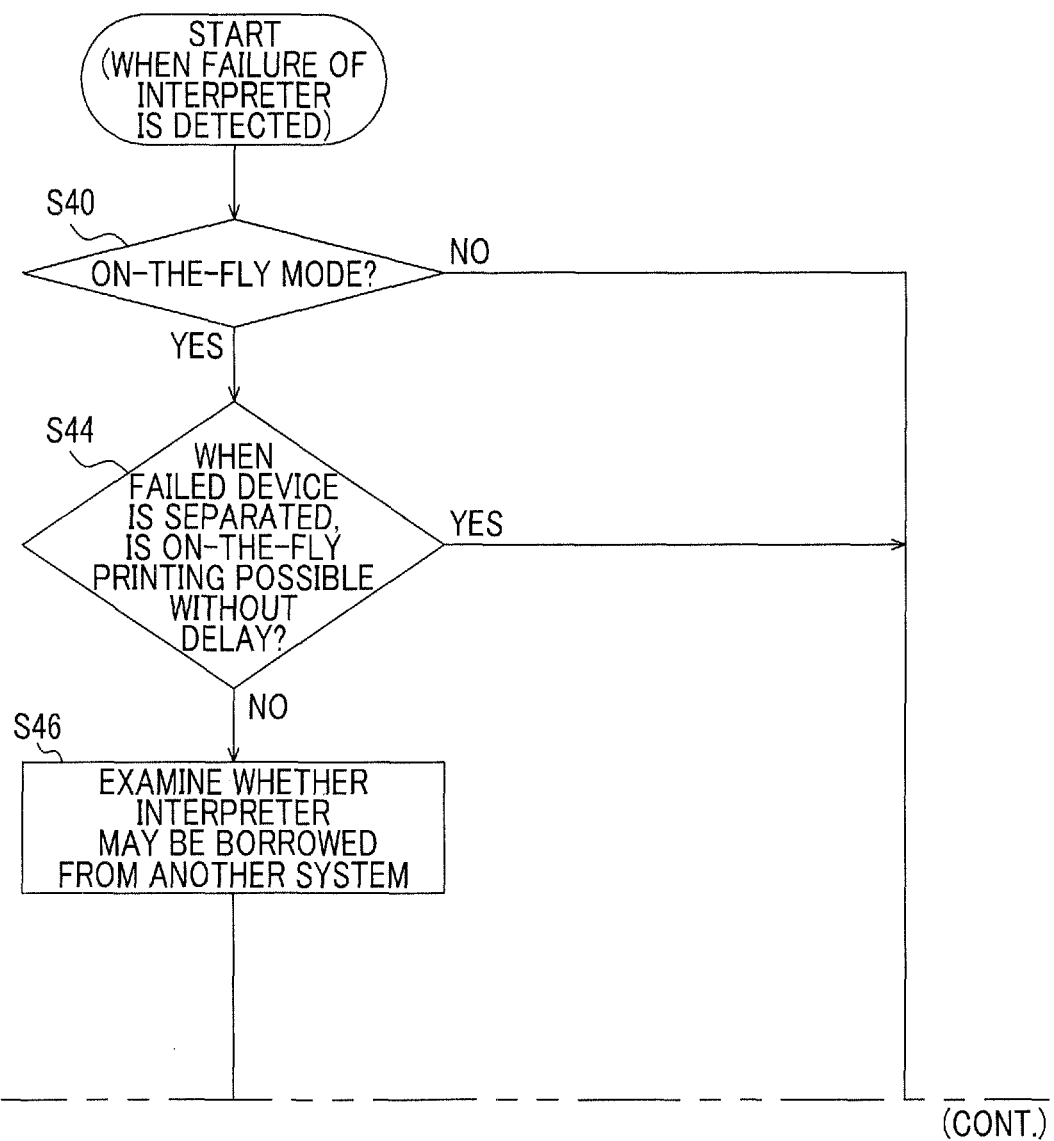

(A) of FIG. 6 and (B) of FIG. 6 are diagrams describing a system behavior in the related art when one interpreter fails, in the printing system shown in FIG. 5;

(A) of FIG. 7 and (B) of FIG. 7 are diagrams describing a system behavior in the present exemplary embodiment when an interpreter is failed;

FIG. 8 is a diagram showing an example of a functional configuration of a management apparatus in the present exemplary embodiment;

FIG. 9 is a diagram showing an example of a processing procedure of the management apparatus when a certain interpreter in the printing system is failed;

FIG. 10 is a diagram schematically showing an example of an inquiry screen used for inquiring of a user whether to perform a rescue process at the time of detection of a failure;

(A) of FIG. 11 and (B) of FIG. 11 are diagrams describing a method of calculating missing pages at the time of detection of a failure in an accumulation print mode;

(A) of FIG. 12 and (B) of FIG. 12 are diagrams describing a method of calculating missing pages at the time of detection of a failure in an on-the-fly print mode;

(A) of FIG. 13 and (B) of FIG. 13 are diagrams describing a process of a modification example; and FIG. 14 is a diagram showing an example of a processing procedure of a management apparatus when a certain interpreter is failed in the modification example.

DETAILED DESCRIPTION

Figure 1:
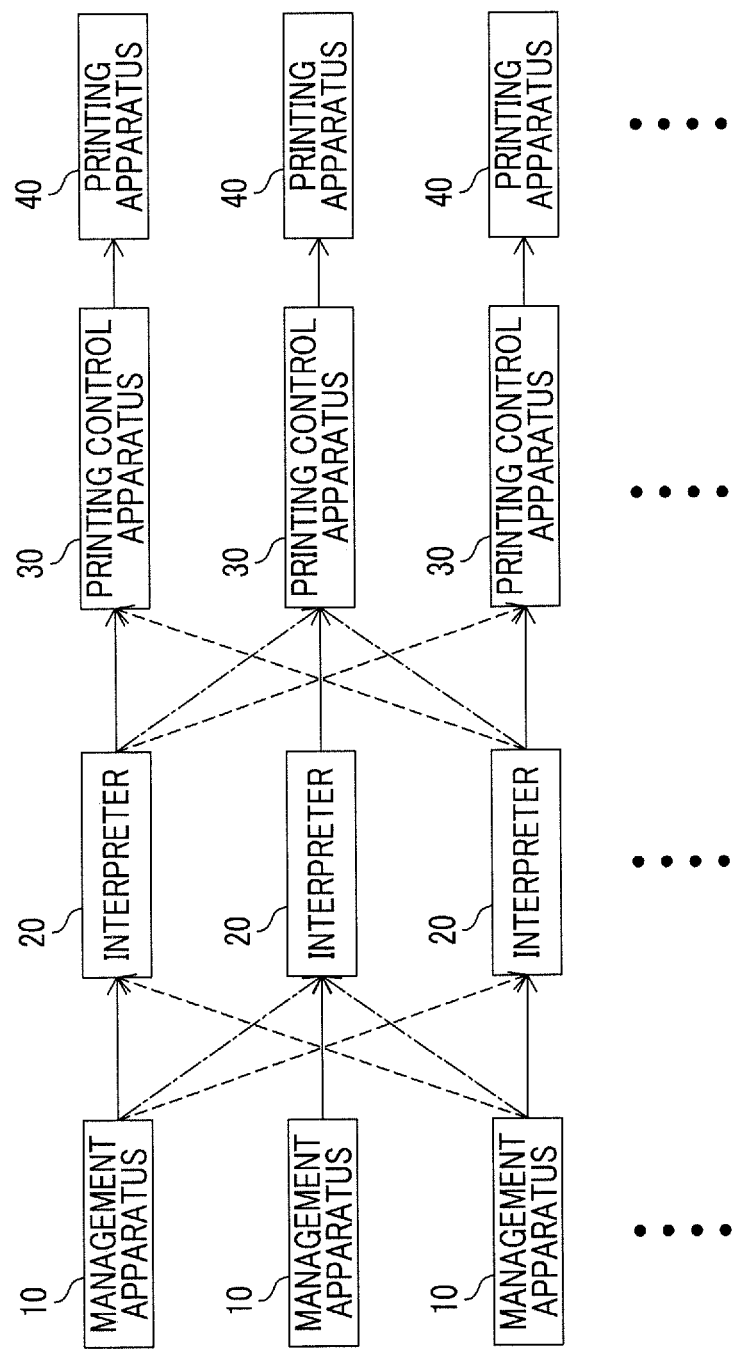
FIG. 1 is a diagram describing a printing system to which control of an exemplary embodiment is applied.

Referring to FIG. 1, an overview of a functional configuration of a system to which control according to an exemplary embodiment is applied will be described.

A printing system of the present exemplary embodiment is configured to include one management apparatus 10, one or more interpreters 20, one or more printing control apparatuses 30, and one or more printing apparatuses 40. In other words, one management apparatus 10 manages one or more interpreters 20, one or more printing control apparatuses 30, and one or more printing apparatuses 40 under its own control so as to configure one printing system. For configuring the printing system, the user may select how to combine the management apparatus 10, the interpreter 20, the printing control apparatus 30, and the printing apparatus 40. As shown in FIG. 1, in an environment in which plural management apparatuses 10 are present, the printing systems of a maximum of the same number as the number of the management apparatuses 10 are configurable.

What is shown in FIG. 1 is, for example, so to speak, a super system provided in one office. The user combines components (the management apparatus 10, the interpreter 20, the printing control apparatus 30, and the printing apparatus 40) in the super system, thereby building one or more printing systems in accordance to the purpose. Further, it is possible to change the configuration of each printing system in response to an addition or a removal of components and a change in circumstances.

Next, respective components will be described.

The management apparatus 10 receives a print job from a client computer (not shown) and a portable recording medium, and controls the interpreter 20, the printing control apparatus 30, and the printing apparatus 40 under the control of its own so as to execute the print job (printing). Here, the print job is a print instruction from the user including print data in which an image of each page of a document of an object to be printed is written in a Page Description Language (hereinafter, abbreviated as "PDL").

The management apparatus 10 includes a job management function for managing an execution order of a print job group transmitted from various users.

Further, the management apparatus 10 transmits print data to the interpreter 20 in the same printing system so as to be processed. In a configuration in which plural interpreters 20 are present in the printing system, the management apparatus 10 assigns, for example, different pages within the print data to each interpreter 20 and causes the plural interpreters 20 to perform interpretation processes of the plural pages in parallel.

The interpreter 20 interprets the PDL description of print data received from the management apparatus 10, and generates intermediate data representing the image of each page represented by print data, in response to the result of the interpretation.

The intermediate data is data having a data format of an intermediate size between PDL data generated by a client and print image data of a data format capable of being handled by the printing apparatus 40 (for example, a raster format). The intermediate data format subdivides the image object described in, for example, the PDL into small elements of a simple shape so as to be expressed. As the intermediate data format, for example, a display list format is known. Further, another example of the intermediate data format includes those described in JP-A-2011-150535 by the present applicant and disclosed in the specification of Japanese Application 2013-129948 by the present applicant. As the interpretation process performed by the interpreter 20, those known in the related art may be used, so that the description thereof will be omitted.

The interpreter 20 generates intermediate data of each page which is the result of the interpretation of print data, and transmits the generated intermediate data of each page to the printing control apparatus 30 within the same printing system.

The printing control apparatus 30 supplies the printing apparatus 40 with print image data, and controls the printing apparatus 40 so as to perform printing of the print image data. In this example, the printing control apparatus 30 processes intermediate data of each page received from the interpreter 20 and generates print image data of each page. The print image data is data in which the image of each page of an object to be printed is represented in a format capable of being handled by the printing apparatus 40 such as, for example, a raster format. Further, the printing control apparatus 30 may have an imposition function. The imposition function is a function for assigning plural page (logical pages) represented by PDL data (thus intermediate data) to one page (physical page) of a print recording medium. For example, when two logical pages are imposed to one physical page, print image data is obtained in which images of two logical pages are arranged on one physical page. In addition, for a conversion process or an imposition from the intermediate data to the print image data, schemes in the related art may be used, and thus the description thereof will be omitted here. The printing control apparatus 30 supplies the printing apparatus 40 with print image data of each page generated so as to be printed.

The printing apparatus 40 receives print image data supplied from the printing control apparatus 30, and prints an image represented by the print image data on a recording medium such as a sheet.

In the example of FIG. 1, while the combination of the management apparatus 10, the interpreter 20 and the printing control apparatus 30 for configuring the printing system may be changed, the printing control apparatus 30 and the printing apparatus 40 are associated one-to-one. This is because the printing control apparatus 30 and the printing apparatus 40 are connected by a high-speed interface capable of high-speed data transfer for high speed printing of print image data having a large amount of data. In this example, when the printing control apparatus 30 to be incorporated into the printing system is determined, the printing apparatus 40 to be incorporated into the printing system is automatically determined. In contrast, the management apparatus 10, the interpreter 20 and the printing control apparatus 30 are connected by a data communication network such as a typical local area network, and the combination may be flexibly changed.

As another example, a system configuration is also possible in which the printing apparatus 40 is connected to a data communication network and print image data is received from the corresponding printing control apparatus 30 through the network. In this case, the printing apparatus 40 to be incorporated into the printing system may be selected regardless of the printing control apparatus 30.

Further, even when the printing control apparatus 30 and the printing apparatus 40 are connected in a fixed manner, the fixed connection relationship is not limited to one-to-one. For example, one printing control apparatus 30 may be connected to plural printing apparatuses 40 so as to control the plural printing apparatuses 40. Further, a configuration is considered in which plural printing control apparatuses 30 are connected to one printing apparatus 40, such as a configuration in which a printing control apparatus 30 that generates print image data for a front side and a printing control apparatus 30 that generates print image data for a rear side are connected to one printing apparatus 40 capable of performing duplex printing on continuous form paper.

Figure 2:
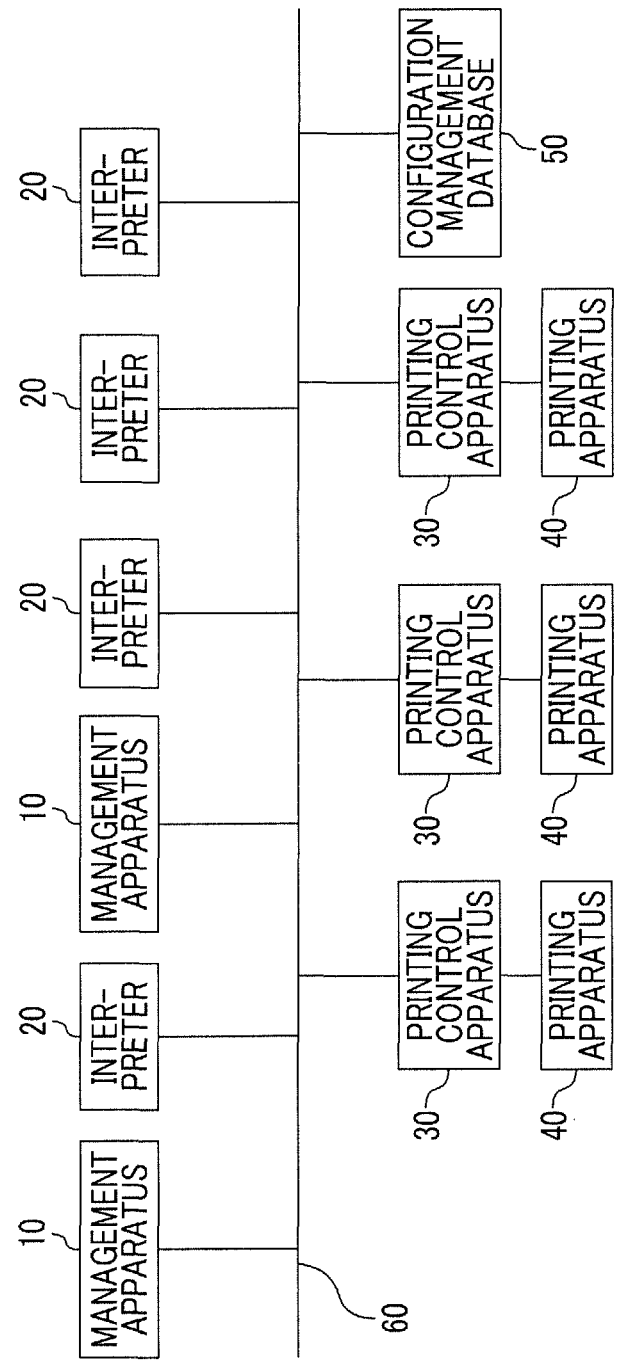
FIG. 2 is a diagram showing an example of a configuration of the printing system to which the control of the exemplary embodiment is applied.

The printing apparatus 40 among components shown in FIG. 1 needs hardware for performing printing on a physical medium, other than a computer that performs control. In contrast, the management apparatus 10, the interpreter 20 and the printing control apparatus 30 may perform a data process and may exist respectively as logically different modules. There are many variations in the physical implementation of the management apparatus 10, the interpreter 20 and the printing control apparatus 30. For example, as shown in FIG. 2, the management apparatus 10, the interpreter 20 and the printing control apparatus 30 may be installed in respective different computers connected to a data communication network 60. Further, by one computer executing plural processes representing functions of the apparatuses of same type (for example, large number of interpreters 20), the computer may be caused to function as plural apparatuses of the same type. Further, by one computer executing the processes of plural apparatuses of different types (for example, a set of the management apparatus 10 and the interpreter 20, a set of the management apparatus, the interpreter 20 and the printing control apparatus 30, or the like), the computer may be caused to function as plural apparatuses of the different types.

In addition, in the example of FIG. 2, a configuration management database 50 is connected to the data communication network 60. The configuration management database 50 is a database for managing information regarding respective units (components) included in the super system and information of a printing system configured in the super system. An example of apparatus management information and printing system management information which are stored in the configuration management database 50 is shown in FIGS. 3 and 4.

As shown in FIG. 3, the apparatus management information includes information regarding apparatus IDs, apparatus types, and addresses for communication for respective apparatuses (the management apparatus 10, the interpreter 20 and the printing control apparatus 30) connected to the data communication network 60 within the super system. The apparatus IDs are identification information for uniquely identifying respective apparatuses in the super system. The apparatus types are information as to which one of three types of the management apparatus, the interpreter, and the printing control apparatus the respective apparatuses are. The addresses for communication are addresses of respective apparatuses on the data communication network 60, and when respective apparatuses communicate with each other, the apparatuses of a transmission source and a transmission destination are represented by the addresses for communication. In the illustrated example, although an Internet Protocol (IP) address is used as the address for communication, an address of another type may be used. Further, the example of FIG. 3 corresponds to an example of FIG. 2 in which respective apparatuses are implemented in separate computers, and the addresses for communication of respective apparatuses are different from each other. As another example, when plural apparatuses are installed in one computer on the data communication network 60, the apparatus IDs have separate values for the plural apparatuses; however, the address for communication is same.

The printing system management information shown in FIG. 4 contains a system ID which is identification information for uniquely identifying a system, and an apparatus ID list of the management apparatus, the interpreter, and the printing control apparatus configuring the system, for each configured printing system. In one printing system, while only one management apparatus 10 is included, plural respective interpreters 20 and printing control apparatuses 30 are included.

Each apparatus (the management apparatus 10, the interpreter 20, and the printing control apparatus 30) included in the super system holds an apparatus ID of its own and information of an apparatus type. Further, each apparatus specifies the address for communication of an apparatus with which the apparatus communicates for the print process by referring to the printing system management information of the configuration management database 50, and performs communication for exchanging data or the like using the address for communication. Further, instead of each apparatus referring to the configuration management database 50, since each apparatus is notified of information stored in the configuration management database 50 from time to time, each apparatus may always hold the latest apparatus management information and printing system management information.

Although in the example of FIG. 2, the configuration management database 50 is provided as an independent apparatus on the data communication network 60, instead thereof, a certain apparatus such as the management apparatus 10 on the data communication network 60 may serve a role of the configuration management database 50.

An example of a process flow of a print job according to the printing system will be described with reference to FIG. 5. In the example of FIG. 5, a printing system 80 is configured with one management apparatus 10, two interpreters 20, and one printing control apparatus 30 (and printing apparatus 40).

(1) The management apparatus 10 receives a print job including PDL data from a client 70. The PDL data of the received print job is held in the management apparatus 10 as an input job 100, and (2) is transferred to two interpreters 20, respectively. One reason why the entire input job 100 is transferred to each interpreter 20 is for considering a case where the input job 100 is described in the page dependent PDL. Since an instruction for a certain page also affects the print images of other subsequent pages in a case of the page dependent PDL, even when the interpreter 20 generates only intermediate data of some pages of the input job 100, it is necessary to interpret the entire input job 100 from the beginning in order to generate the intermediate data correctly. On the contrary, when the input job 100 is described in the page independent PDL, each interpreter 20 may supply only PDL data of a page of the input job 100, intermediate data of which the interpreter 20 is to generate. Further, another reason why the entire input job 100 is transferred to each interpreter 20 in the example in FIG. 5 is that once the entire input job 100 is transferred, even when the page to be assigned (in other words, the page of which intermediate data is to be generated) to the interpreter 20 changes from the predetermined page for any reason thereafter, it is easy to cope with that situation. In other words, the management apparatus 10 may notify the interpreter 20 of only the page number to be assigned, and when the object to be assigned changes, notification of only the page number to be assigned after the change may be given. In contrast, in a case of a scheme where only PDL data of the page to be assigned is provided to the interpreter 20, when there is a change in the predetermined assignment, the PDL data of the page to be assigned after the change is required to be transmitted to the interpreter 20.

(3) The management apparatus 10 instructs the two interpreters 20 to generate intermediate data of respective separate pages. In the illustrated example, the management apparatus 10 instructs one interpreter 20 to generate intermediate data of an odd page, and the other interpreter 20 to generate intermediate data of an even page. For example, first, the management apparatus 10 instructs one interpreter 20 to generate intermediate data of the first page, and the other interpreter 20 to generate intermediate data of the second page, and subsequently instructs generation of intermediate data of the third and fourth pages, the fifth and sixth pages, . . . , respectively.

(4) By such parallel instructions, two interpreters 20 perform the generation of intermediate data of two pages in parallel. Here, when the input job 100 is described in the page dependent PDL, each interpreter 20 interprets the input job 100 from the beginning in order, and changes the internal state according to the interpretation. Then, each interpreter 20 generates intermediate data for the page instructed by the management apparatus 10, according to the internal state. The interpreter 20 includes an intermediate data accumulation unit 22 that accumulates the generated intermediate data and a management table 24 that records information of the page of which the generation of intermediate data is completed. The interpreter 20 stores the intermediate data of the generated page in the intermediate data accumulation unit 22, and adds information specifying the page as information indicating the generated page to the management table 24. The information specifying the page is, for example, a set of identification information of the input job 100 and the page number of the page in the input job 100.

When a timing of a print out is reached, the intermediate data of each page accumulated in the intermediate data accumulation unit 22 is transferred to the printing control apparatus 30 in order. (5) After the printing control apparatus 30 imposes intermediate data of each received page on a physical page according to an imposition condition designated from the user, it rasterizes (that is, conversion into a raster image) the intermediate data, and controls the printing apparatus 40 to print the print image data obtained by the rasterization. In the illustrated example, the logical pages of two pages are imposed for the physical page of one page.

Then, in such a printing system 80, a case is considered in which one interpreter 20 in the printing system 80 is not able to perform a normal operation due to failure. For example, as shown in (A) of FIG. 6, it is assumed that a failure occurs in the interpreter 20 in charge of an even page of the job being executed, among the interpreters 20 included in a printing system 80-1. Among a super system to which the printing system 80-1 belongs, it is assumed that a separate printing system 80-2 is present but does not perform the job at that time.

In such a case, when there is no any measure, as shown in (B) of FIG. 6, the intermediate data of the even page assigned to the failed interpreter 20 in the printing system 80-1 is not generated, so that (1) printing by the printing control apparatus 30 and the printing apparatus 40 is stopped in the middle thereof. (2) As a result, it becomes a state in which the entire printing system 80-1 is not used. In this state, (3) the user inputs again the job that has been executed up to that time in a printing system 80-2 which is currently not in use within the same super system from the client 70, (4) performs again interpretation from the first page in order, and (5) performs reprinting from the first page. Although it is considered that the stopped printing system 80-1 performs reprinting from the page subsequent to the printed page, since an operation to find the printed page becomes complicated in many cases, it is likely to perform reprinting from the first page. Further, in this case, the intermediate data which has already been generated is discarded in an interpreter 20-1 which performs a normal operation.

With respect to such a problem, in the present exemplary embodiment, as shown in (A) of FIG. 7, when a failure occurs in one interpreter 20-2 in the printing system 80, the management apparatus 10 detects the failure. Even in this case, as shown in (B) of FIG. 7, (1) since intermediate data of an even page is not supplied, printing is paused.

(2) However, in this exemplary embodiment, when the interpreter 20-1 which does not fail has already generated a large amount of the intermediate data to some extent, the printing system 80-1 is not stopped, and the management apparatus 10 thereof performs a rescue process. In the rescue process, the failed interpreter 20-2 is at least temporarily separated from the printing system 80-1, and deviates from an assignment object of a page group. Then, pages which have not yet been printed out among pages assigned to the failed interpreter 20-2 are specified, and the specified page group is re-assigned to a remaining interpreter 20-1 which performs a normal operation so as to be processed. (3) Since the re-assignment is performed by the management apparatus 10 of the printing system 80-1 having data of the print job being processed, it is not necessary to input data of the print job in the printing system side from the client as in the case where a separate printing system 80-2 performs reprinting from the beginning. (4) In the example of (A) of FIG. 7 and (B) of FIG. 7, although intermediate data of an odd page which has already been generated is held in the interpreter 20-1 which does not fail, the process for the even page under the charge of the failed interpreter 20-2 is also assigned thereto from the management apparatus 10. (5) When the interpreter 20-1 performs an interpretation of the even page to generate intermediate data, it becomes possible to restart the paused printing, and printing is restarted from the subsequent page in the same printing system 80.

In order to realize the above processes, the management apparatus 10 includes, for example, functional modules shown in FIG. 8.

The assignment unit 12 assigns the pages of the print job being executed to each interpreter 20 in the same printing system 80 so as to be interpreted. When a failure occurs in each interpreter 20 in the same printing system 80, a failure detector 14 detects the occurrence of the failure. With respect to a method of detecting the occurrence of the failure, a specific example thereof will be described later. When the failure detector 14 detects a failure of a certain interpreter 20, a failure handling and processing unit 16 performs a process to continue a print job corresponding to the failure. In other words, the failure handling and processing unit 16 separates the interpreter 20 from the printing system 80, specifies the pages which have been assigned to the failed interpreter 20, and reassigns the specified pages (or all pages for which the print job has not been processed, including the specified pages) to the remaining normal interpreter 20.

The foregoing describes an overview of the control of the present exemplary embodiment when the interpreter 20 in the printing system 80 fails. Next, the control of the present exemplary embodiment will be described in further detail with reference to FIG. 9 to (B) of FIG. 12.

The procedures shown in FIG. 9 are performed when it is detected that a failure occurs in a certain interpreter 20 in the printing system 80 under the control of the management apparatus 10. There are two modes for the method of detecting the failure when roughly classified.

One mode is a case where the management apparatus 10 is no longer able to communicate with the (failed) interpreter 20. The example includes a case where the interpreter 20 crashes, a case where power is cut off, or a case where a failure occurs in a network connecting the management apparatus 10 and the interpreter 20. Since the management apparatus 10 and each interpreter 20 in the same printing system 80 constantly perform communication of an inquiry and a response with each other for performing a print job, for example, when a response for the inquiry is not returned from the interpreter 20, it is determined that the interpreter 20 is failed.

Another mode of the failure detection is a case where the control unit in the interpreter 20 detects a logical or a physical failure in the interpreter 20, and notifies the management apparatus 10 of the failure detection. The logical failure includes, for example, damage to management information in the interpreter 20, an error of a program being executed, and the like. The physical failure includes, for example, a failure of a physical module such as a hard disk included in the interpreter 20. In this mode, the management apparatus 10 is able to communicate with the interpreter 20 and the interpreter 20 itself notifies the management apparatus 10 of the fact that an error has occurred in its own apparatus, so that the management apparatus 10 detects the failure of the interpreter 20.

When the management apparatus 10 detects that a failure occurs in a certain interpreter 20 in the printing system 80 during an execution of a certain print job, it determines whether or not the number of pages for which an interpreter 20 group in the printing system 80 finishes the interpretation process (in other word, the generation of the intermediate data is finished) is greater than a threshold (S10).

Then, when the number of interpreted pages is a threshold or less (the determination result in S10 is No), since a print result may be obtained quickly when the print job is restarted in a separate printing system from the beginning, the management apparatus 10 interrupts the print job (S12). Thereafter, the user inputs the same job in a separate printing system 80 from the client 70 and requests printing.

In this manner, in the example of FIG. 9, when a print result may be obtained fast when the print job is restarted in a separate printing system from the beginning, the rescue process described above is not performed. The threshold of the number of pages used in the determination of S10 may be a fixed value, regardless of the number of total pages of the print job, or a value proportional to the number of total pages (in other words, a number of pages of a certain ratio to the number of total pages is regarded as the threshold). In addition, the management apparatus 10 may calculate the number of interpreted pages from the page number assigned to each interpreter 20.

When it is determined that the number of interpreted pages is greater than the threshold in S10, the management apparatus 10 inquires of the user who inputs the print job whether or not to continue the print job by separating the failed interpreter 20 (S14). The inquiry may be performed by displaying, for example, an inquiry screen 200 exemplified in FIG. 10 on a display apparatus connected to the management apparatus 10 or the client 70. The inquiry screen 200 includes a message indicating which apparatus has failed ("interpreter 2" in the illustrated example) and which job is being executed ("job 1" in the illustrated example). Further, the inquiry screen 200 indicates information regarding the number of interpreted pages and the number of un-interpreted pages during the print job. The information is determination material for determination by the user whether to continue the process in the printing system 80 by separating the failed interpreter 20 or to restart the process in a separate printing system 80 from the beginning. As the determination material, in addition to that exemplified in FIG. 10, for example, a ratio of the number of interpreted pages to the number of pages of an entire print job may be used. When the user selects not continuing the process in the printing system 80 in response to the inquiry (the determination result in S14 is No), the management apparatus 10 interrupts the execution of the print job (S12).

When the user selects continuing the process in the printing system 80 in response to the inquiry (the determination result in S14 is Yes), the management apparatus 10 separates the failed interpreter 20 from the printing system 80 (S16). In other words, the management apparatus 10 accesses the configuration management database 50, and deletes the apparatus ID of the failed interpreter from a list of interpreters of information entry of a system to which its own unit belongs among the printing system management information. Instead of deleting the ID of the failed interpreter, attribute information indicating "temporarily disabled" may be added to the ID. In response to the change in the system configuration, each apparatus in the printing system no longer recognizes the failed interpreter 20 as an apparatus in the same system.

Next, the management apparatus 10 obtains an interpreted page list from each interpreter 20 in the printing system 80 (the failed interpreter 20 is not already included in the printing system) (S18). The interpreted page list is a list of page numbers of pages interpreted by the interpreter 20 (in other words, intermediate data is generated). The interpreter 20 receives assignment from the management apparatus 10, manages the page numbers of the already-interpreted pages, and provides a list of the page numbers to the management apparatus 10.

Further, the management apparatus 10 determines whether or not a current operation mode is an on-the-fly print mode (S20). In the example, there are an on-the-fly print mode and an accumulation print mode as an operation mode of the printing system. In S20, it is determined which mode the current operation mode is. The accumulation print mode is a mode for separately instructing the interpretation and the printing of one print job so as to be executed. In other words, in this mode, first, the interpretation of the print job is instructed, and the printing system 80 is instructed to generate and accumulate the intermediate data of the print job, and then, after, for example, the accumulation of intermediate data of all pages of the print job is completed, the print out of the intermediate data is instructed. For example, this mode is used in a work form in which the interpretation of the print job is only performed during non-working hours such as at night, and when working hours begin, the intermediate data of the interpretation result is printed out. In contrast, the on-the-fly print mode is a mode in which the interpretation of the print job and the printing of interpretation result (intermediate data) are executed in series of flow. At the time of starting a print job or the like, the user designates which mode the job is to be processed in.

When the determination result in S20 is No (accumulation print mode), the management apparatus 10 specifies pages which have been missed, from the interpreted page list acquired from each interpreter 20 in S18 (S22). Here, the pages which have been missed (hereinafter, referred to as "missing pages") are referred to as a remaining page group other than the interpreted pages included in the interpreted page list among all pages of the print job. Further, as another example, among pages which have already been assigned to the interpreter 20 group, remaining pages other than pages included in the acquired interpreted page list may be referred to as missing pages.

In contrast, when the determination result in S20 is Yes (on-the-fly print mode), the management apparatus 10 acquires the number of printed pages from the printing control apparatus 30 in the same printing system 80 (S24). Then, the management apparatus 10 specifies missing pages from the interpreted page list acquired from each interpreter 20 in S18, the number of printed pages acquired from the printing control apparatus 30 in S24, and information of imposition designation of the print job (S26). Although the printed pages may already be present in the on-the-fly print mode, such printed pages are not required to be included among the missing pages (are required to be interpreted again due to the failure of the interpreter). Further, since there are some cases where plural logical pages are imposed in the printed pages (physical page), it is possible to know a page number up to which the logical pages are printed in the printed-out physical page group, by referring to information regarding imposition designation. Accordingly, missing pages may be specified by combining the interpreted page list acquired from each interpreter 20 with the number of printed pages and the information regarding the imposition designation. For example, the missing pages are calculated by further subtracting the logical pages printed on the printed pages (physical pages) from the remainder which is obtained by subtracting the interpreted pages (logical pages) from all pages of the print job. Further, in a separate example, the missing pages are specified as the remainder obtained by further subtracting the logical pages printed on the printed pages from the remainder which is obtained by subtracting the interpreted pages from the pages which have been already assigned to the interpreter 20 group.

After S22 or S26, the management apparatus 10 reassigns the specified missing page group to each interpreter 20 (the failed interpreter 20 has been deleted) in the printing system so as to be subjected to the interpretation process (S28). After deleting the failure interpreter 20, when only one normal interpreter 20 remains in the printing system 80, all missing page groups are reassigned to the one interpreter 20. When plural remaining normal interpreters 20 are present, the missing page group is distributed among the plural interpreters 20. In addition, all interpretation processes of the missing page group are not required to be assigned to the plural normal interpreters 20, but may be assigned to only one interpreter 20 which is determined based on the predetermined rule, and may be assigned to some of the plural normal interpreters 20.

After S28, it is determined whether or not the mode of the print job is the on-the-fly print mode (S30), and when the mode is the on-the-fly print mode, when the generation of the intermediate data of the logical pages to be printed on the first physical page of the unprinted portions during the print job by reassignment of S28 is completed, the print process is restarted (S32).

In addition, although being omitted in FIG. 9, when only one interpreter 20 is present in the printing system 80, when the failure of the interpreter 20 is detected, the management apparatus 10 does not proceed to the process after S10, and interrupts the print job being executed.

Next, in the accumulation print mode and the on-the-fly print mode, the specific example of the calculation of missing pages at the time of failure detection (S22 and S26) will be described with reference to (A) of FIG. 11 to (B) of FIG. 12, respectively. The examples of (A) of FIG. 11 to (B) of FIG. 12 correspond to a case where a failure occurs in the interpreter 20-2 in the printing system 80 including two interpreters 20-1 and 20-2 exemplified in (A) of FIG. 7 and (B) of FIG. 7.

First, a case of the accumulation print mode will be described with reference to (A) of FIG. 11 and (B) of FIG. 11. Here, a description will be made assuming that a rescue process is performed regardless of S10 and S14 in the procedures of FIG. 9.

In this example, as a premise, it is assumed that the management apparatus 10 alternately assigns pages to two interpreters 20-1 and 20-2 in order from the first page of the print job in which the number of total pages is 10 pages. Therefore, odd pages are assigned to the former and even pages are assigned to the latter. Before a failure occurs, the management apparatus 10 assigns the pages 1, 3, and 5 of a certain job to the interpreter 20-1 and assigns the pages 2, 4, and 6 to the interpreter 20-2, in this order. It is assumed that a failure of the interpreter 20-2 is detected when the interpreters 20-1 and 20-2 finish the interpretation of the page group assigned thereto and then receive the assignment of the subsequent page. At this time, intermediate data of the pages 1, 3, and 5 is accumulated in the intermediate data accumulation unit 22 of the interpreter 20-1. The interpreted page numbers 1, 3, and 5 are registered in the management table 24. Similarly, the intermediate data of the pages 2, 4, and 6 is accumulated in the intermediate data accumulation unit 22 of the interpreter 20-2, and the interpreted page numbers 2, 4, and 6 are registered in the management table 24.

(1) The management apparatus 10 which detects the failure of the interpreter 20-2 separates the interpreter 20-2 from the printing system 80, and sends a request for an interpreted page list to the normal (not failed) interpreter 20-1 in the printing system 80.

(2) The interpreter 20-1 which receives the request recognizes that the interpreted pages at the present time are the pages 1, 3, and 5 by referring to the management table 24, and creates a list of the page numbers 1, 3, and 5 as the interpreted page list. (3) Then, the created interpreted page list is returned to the management apparatus 10 in response to the request.

(4) The management apparatus 10 specifies pages which have been missed, from an interpreted page list received from the normal interpreter (in this case, only 20-1) and information, for example, regarding the print job currently being executed (the number of total pages is 10 pages). In this example, among first to tenth pages of the print job, the remainders other than the page numbers 1, 3, and 5 in the interpreted page list received from the only one normal interpreter 20-1, in other words, the pages 2, 4, and 6 to 10, are specified as the missing pages. Further, in another example, the management apparatus 10 may specify, as the missing pages, the remaining pages 2, 4, and 6 other than the interpreted pages 1, 3, and 5 among the first to sixth pages which are assigned to the interpreters 20-1 and 20-2. In addition, the pages which have been already assigned to the normal interpreter 20 (however, the interpretation process is not completed) are omitted from the missing pages, among missing pages specified in this manner.

(5) The management apparatus 10 assigns the specified missing pages to the normal interpreter 20-1 in a page order, and instructs the generation of the intermediate data. In the illustrated example, the pages 2, 4, and 6 to 10 are assigned in a page order. The interpreter 20-1 performs the interpretation process of the pages which are assigned in order. In addition, when the management apparatus 10 assigns the missing pages to the interpreter 20-1, there may be some cases where the interpreter 20-1 is still processing the page (for example, the seventh page) which has been already assigned before the failure (of the interpreter 20-2) occurs. In such a case, the interpreter 20-1 waits for the process of the page being processed to finish and performs the assignment of the missing pages. Alternatively, although the missing pages may be assigned in the middle of the process of the page, the interpreter 20-1 starts the process of the assigned missing pages after the process of the page currently being processed is finished.

In addition, when the remaining pages 2, 4, and 6 other than the interpreted pages 1, 3, and 5 are specified as missing pages among the first to sixth pages assigned to the interpreters 20-1 and 20-2, the management apparatus 10 assigns the missing pages 2, 4, and 6 to the normal interpreter 20-1, and then assigns the remaining seventh to tenth pages being subjected to the print job to the interpreter 20-1.

Since the foregoing description relates to the accumulation print mode, the interpretation result (intermediate data) of the page is accumulated in the intermediate data accumulation unit 22 and the arrival of a separate output instruction is awaited.

Next, a case of the on-the-fly print mode will be described with reference to (A) of FIG. 12 and (B) of FIG. 12. Even in this example, a description will be made assuming that a rescue process is performed regardless of S10 and S14 in the procedures of FIG. 9. It is assumed that this example is also an example performed under the same premise as that of (A) of FIG. 11 and (B) of FIG. 11.

(1) The management apparatus 10 which detects the failure of the interpreter 20-2 separates the interpreter 20-2 from the printing system 80, and collects an interpreted page list from the normal interpreter 20-1 in the printing system 80. This process is the same as in the case of (A) of FIG. 11 and (B) of FIG. 11.

(2) Further, the management apparatus 10 sends a request for the number of printed pages to the printing control apparatus 30 in the printing system 80. In this example, at this time, it is assumed that the printing of the physical pages of two pages is completed. Accordingly, the printing control apparatus 30 gives a response of "2" to the management apparatus 10 as the number of printed pages.

(3) The management apparatus 10 specifies pages which have been missed from the acquired interpreted page list, the number of printed pages, and the imposition designation of the print job (in the illustrated example, the logical pages of two pages are printed for the physical page of one page, so-called a 2-up designation), for example, information on the print job currently being executed (the number of total pages is 10).

In this example, among all pages 1 to 10 of the print job, the remainders other than the page numbers 1, 3, and 5 in the interpreted page list received from the only normal interpreter 20-1, that is, the pages 2, 4, and 6 to 10 are candidates of the missing page. Meanwhile, since the number of the printed pages is two and the imposition is 2-up, the first to fourth pages (logical pages) are printed. Accordingly, the remainder obtained by removing the printed pages from the candidates described above, that is, the sixth to tenth pages, are specified as the missing pages.

Further, as another example, the management apparatus 10 specifies, as the candidates of the missing pages, the remaining pages 2, 4, and 6 other than the interpreted pages 1, 3, and 5 among the first to sixth pages assigned to interpreters 20-1 and 20-2, and may specify the sixth page which is the remainder obtained by subtracting the printed pages 1 to 4 from the candidates as the missing page.

(4) The management apparatus 10 assigns the specified missing pages to the normal interpreter 20-1 in a page order and instructs the generation of the intermediate data. In the illustrated example, the sixth to tenth pages are assigned in a page order. The interpreter 20-1 performs an interpretation process of the pages which are assigned in order.

(5) Then, when the intermediate data of the sixth page is generated, the generated intermediate data together with the intermediate data of the fifth page which has been already generated are supplied to the printing control apparatus 30, and a third physical page in which the fifth and sixth pages are arranged is printed out. Hereinafter, each time that two pages at a time are interpreted in a page order, a physical page on which they are arranged is printed out.

Although it is described that all pages of the print job are printed in the examples of (A) of FIG. 11 to (B) of FIG. 12, there are some cases where only some pages of the print job are designated as objects to be printed. For example, there may be an instruction to specify pages 101 to 200 of the print job as objects to be printed. In this manner, when there is an instruction to print (or only an interpretation) some pages of the print job, the missing pages may be obtained from some page groups of the objects to be printed.

Further, in the foregoing examples, although the management apparatus 10 obtains missing pages based on the interpreted page list acquired from each interpreter 20, this is only an example. Since the management apparatus 10 assigns pages to each interpreter 20, when the management apparatus 10 stores which pages are assigned to each interpreter 20, the management apparatus 10 may specify missing pages, from the information of the pages assigned to the failed interpreter 20 which is stored.

Further, in the foregoing examples, although the printing control apparatus 30 provides the number of the printed pages indicating the number of the printed physical pages to the management apparatus 10 for calculating the missing pages at the time of failure in the on-the-fly print mode, this is only an example. The printing control apparatus 30 receives the intermediate data of each logical page from each interpreter 20 to perform an imposition, and thus recognizes which logical page is imposed on the printed physical page. Accordingly, the printing control apparatus 30 generates the page number list of logical pages (or the number of logical pages) printed on the printed physical page so as to be provided to the management apparatus 10, and the management apparatus 10 may specify the printed logical page from the information.

Next, with reference to (A) of FIG. 13, (B) of FIG. 13 and FIG. 14, the modification example of the foregoing exemplary embodiment will be described. In the modification example, as shown in (A) of FIG. 13 and (B) of FIG. 13, when a failure occurs in the interpreter 20-2 in a certain printing system 80-1, an interpreter 20-3 is temporarily borrowed from the separate printing system 80-2 belonging to the same super system, thereby allowing the reduction in the interpretation processing capability of the printing system 80-1 to be compensated for.

FIG. 14 shows an example of a processing procedure of the modification example. When the management apparatus 10 of the printing system 80-1 detects that a failure occurs in the interpreter 20-2 in the same system, it starts the process shown in FIG. 14. Hereinafter, the processing procedure of FIG. 14 will be described with reference to (A) of FIG. 13 and (B) of FIG. 13.

In this process, first, the management apparatus 10 determines whether or not the mode of the print job currently being executed is the on-the-fly print mode (S40).

When the mode is not the on-the-fly print mode (in other words, when the mode is the accumulation print mode), the management apparatus 10 separates the failed interpreter 20-2 from the printing system 80-1 (S42). Then, the missing pages specified by the method described in the foregoing exemplary embodiment are assigned to the remaining interpreter 20-1 in the printing system 80-1 (S52), and the printing which has been paused at the time of detection of failure is restarted (S54). In this case, the printing system 80-1 performs interpretation of the missing pages in one interpreter 20-1.

In the accumulation print mode, the interpretation process of the print job is not required to be adjusted to the progress of the printing in the printing apparatus 40. Accordingly, in a state where the failed interpreter 20-2 is separated and the interpretation processing capability is reduced, even when the missing pages (and the subsequent remaining pages) are processed, a problem does not occur in general. Thus, in the procedure of FIG. 14, when the mode is the accumulation print mode, the interpreter 20-3 is not borrowed from a separate printing system, and the processing of the missing pages is performed simply by separating the failed interpreter 20-2 from the printing system 80-1.

When it is determined that the mode is the on-the-fly print mode in S40 and the failed interpreter 20-2 is separated from the printing system 80-1, the management apparatus 10 determines whether or not the on-the-fly printing is established (S44). "The on-the-fly printing is established" refers to a state where the speed of the interpretation process of the interpreter 20 group in the printing system 80-1 is equal to or higher than the print speed of the printing apparatus 40 in the same system, and the interpretation result of each page may be supplied to the printing apparatus 40 from the interpreter 20 group without a delay. The management apparatus 10 may hold or receive information regarding the processing speed of respective interpreters 20 in the printing system 80-1 and the print speed of the printing apparatus 40, and determines, from the information, whether or not the processing speed of the remaining normal interpreter 20-1 other than the failed interpreter 20-2 is equal to or higher than the print speed of the printing apparatus 40. When the determination result is positive (the interpretation processing speed is equal to or higher than the print speed), the determination result of S44 becomes "the on-the-fly printing is established". In addition, when plural normal interpreters 20 remain, it is considered that the total of the processing speeds of the apparatuses is approximately equal to the interpretation processing speed of the entire printing system 80-1, so that the total and the print speed may be compared.

When it is determined as "established" in S44 (the determination result is Yes), the management apparatus 10 simply separates the failed interpreter 20-2 from the printing system 80-1 (S42), assigns the missing pages to the remaining interpreter 20-1 in the printing system 80-1 (S52), and restarts the printing (S54).

When it is determined as "not established" in S44 (the determination result is No), the management apparatus 10 examines whether an interpreter is borrowed from the separate printing system 80-2 within the same super system (S46).

In this step, for example, the management apparatus 10 accesses the configuration management database 50, receives information of a separate management apparatus 10 present in the super system, and inquires of the separate management apparatus 10 whether the interpreter 20 may be borrowed. When plural interpreters 20 are included in the printing system 80 managed by the management apparatus 10, one or more interpreters in which lending prohibition is not set are present among the plural interpreters 20, and an interpreter 20 which is not currently performing the interpretation process is present among the interpreters 20 in which lending prohibition is not set, the separate management apparatus 10 which has received the inquiry returns a response that the interpreter 20 may be borrowed. The response includes information (for example, apparatus ID) of the interpreter 20 that may be borrowed (that is, lending prohibition is not set and is not currently performing a process).

When the management apparatus 10 of the printing system 80-1 receives a response that an interpreter may be borrowed from a certain management apparatus 10 within the super system (the determination result of S48 is Yes), it separates the failed interpreter 20-2 from the printing system 80-1 and incorporates the interpreter 20 which has been reported as being able to be borrowed from a separate management apparatus 10 into the same system (S50). At this time, the separate management apparatus 10 that returns a response that the interpreter 20 may be borrowed temporarily separates the interpreter 20 from its own printing system 80.

After such a reconfiguration of the system, the management apparatus 10 of the printing system 80-1 assigns a missing page group to the interpreter 20 group of the same system including the borrowed interpreter 20 so as to perform an interpretation (S52). Then, a print output process which has been paused until that time is restarted (S54).

In S48, when a response that an interpreter may be borrowed is not obtained from any management apparatus 10 within the super system (the determination result is No), the management apparatus 10 of the printing system 80-1 notifies the user of the fact that the print speed is reduced due to the failure of a part of interpreters (S56), and inquires of the user whether to continue the print job (S58). In addition, the on-the-fly printing is "not established" and a problem occurs in the print process of the printing apparatus 40 (for example, such as the occurrence of an empty interval of the pages to be printed on the continuous business form paper due to the supply delay of the print image data in the printing of a continuous business form paper), the user may be notified of the fact that such a problem occurs and may be caused to determine whether to continue the print job.

When the user returns a response to continue the printing for the inquiry, the management apparatus 10 separates the failed interpreter 20-2 from the printing system 80-1 (S42), assigns the missing pages to the remaining interpreter 20-1 in the printing system 80-1 (S52), and restarts printing (S54). Conversely, when the user returns a response not to continue the printing for the inquiry, the management apparatus 10 interrupts the print job (S59) and terminates the process for the print job.

Returning to (A) of FIG. 13 and (B) of FIG. 13, the specific example of the process of the modification example will be described. In the modification example, when a failure of the interpreter 20-2 in the printing system 80-1 is detected, (1) the management apparatus 10 in the same system separates the interpreter 20-2 from the system and (2) borrows the interpreter 20-3 that may be borrowed from the separate printing system 80-2. Thus, the printing system 80-1 has a system configuration having the same two interpreters 20 as before the failure occurs, and achieves the same interpretation processing speed as before the failure occurs. The management apparatus 10 transfers the data of the print job which is currently being executed to the borrowed interpreter 20-3. (3) Since the print job is not restarted in the separate printing system 80-2 from the beginning, it is not necessary to input again the print job to the printing system 80-1 from the client 70. (4) The management apparatus 10 performs reassignment of the missing pages to the interpreter 20 operating normally in the printing system 80-1. (5) In the reassignment, the assignment of the process of the page to the existing interpreter 20-1 as well as to the borrowed interpreter 20-3 is performed. Thus, the interpreters 20-1 and 20-3 perform the interpretation of the missing page in parallel.

In the foregoing modification example, it is a prerequisite that all interpreters 20 have the same processing speed. In contrast, when the processing speeds of the interpreters 20 are different, among the interpreters 20 which have been notified as being able to be borrowed from a separate management apparatus 10, an interpreter having a processing speed exceeding the processing speed of the failed interpreter 20-2 is selected and borrowed. Further, when there is no interpreter alone having a processing speed equal to or higher than the processing speed of the failed interpreter 20-2 among interpreters 20 that may be borrowed, it is determined whether or not the processing speed equal to or higher than the processing speed of the failed interpreter 20-2 may be achieved by the combination of plural interpreters 20 that may be borrowed. Then, when a combination is found that may achieve the processing speed equal to or higher than the processing speed of the failed interpreter 20-2, each interpreter 20 included in the combination is borrowed and incorporated into the printing system 80-1.

In the foregoing modification example, when the execution of the print job is completed using the borrowed interpreter 20-3, the management apparatus 10 of the printing system 80-1 returns the interpreter 20-3 to the printing system 80-2 to which the interpreter 20-3 originally belongs. More specifically, the management apparatus 10 deletes the apparatus ID of the interpreter 20-3 from management information of the printing system 80-1 to which the management apparatus 10 belongs, within the printing system management information (see FIG. 4) in the configuration management database 50. Further, the management apparatus 10 notifies the management apparatus 10 of a lending source of a return of the apparatus ID, and the management apparatus 10 of the lending source receives the notification and adds the apparatus ID to the management information of the printing system 80-2 to which the management apparatus 10 of a lending source belongs, within the printing system management information.

Although in the examples of (A) of FIG. 13, (B) of FIG. 13 and FIG. 14, borrowing the interpreter 20 from the separate printing system 80 is limited only to the case of the on-the-fly print mode (S44 in FIG. 14), this is only an example. Even in the case of the accumulation print mode, the interpreter 20 may be borrowed from another system. However, as described above, since in the on-the-fly print mode, the speed of the interpretation process is generally greatly required, borrowing the interpreter 20 from another system is meaningful.

Hitherto, the exemplary embodiments and the modification example of the present invention are described. The exemplary embodiments and the modification example are only examples of the configuration according to the present invention. Various modifications are possible within the scope of the present invention. For example, although in the foregoing exemplary embodiments and the modification example, the interpreter 20 converts the PDL data into intermediate data and the printing control apparatus 30 converts the intermediate data into print image data such as that in a raster format, this is not essential. Instead thereof, a configuration is possible in which the interpreter 20 converts the PDL data into print image data and the printing control apparatus 30 arranges print image data transferred from one or more interpreters 20 in a print order or imposes the print image data so as to be provided to the printing apparatus 40.

Further, although in the foregoing examples, the management apparatus 10 assigns corresponding portions to the plural interpreters 20 within the same printing system 80 in units of pages, instead thereof, the assignment may be performed, for example, in a band and or tile other than the page. The band is a belt-shaped region obtained by equally dividing a page with a straight line parallel to a main scanning line during the print process of the printing apparatus 40, and the tile is a rectangular region obtained by equally dividing a page vertically and horizontally with straight lines which are respectively parallel to a main scanning line and a sub scanning line of the print process.

For example, the management apparatus 10, the interpreter 20, and the printing control apparatus 30 which are exemplified above are realized by causing a general-purpose computer to execute a program representing the processes of respective functional modules of the apparatuses. The computer referred to here has a circuit configuration as hardware, in which a microprocessor such as a CPU, a memory (primary storage) such as a random access memory (RAM) and a read-only memory (ROM), a secondary storage controller controlling a secondary storage such as a hard disk drive (HDD), a solid-state drive (SDD), and a flash memory, various input and output (I/O) interfaces, a network interface performing the control for connection with a wireless or wired network, and the like are connected with each other through, for example, a bus. Further, a disk drive for reading and/or writing for a portable disk recording medium such as a CD, a DVD and a Blu-ray disc through, for example, an I/O interface, a memory reader and writer for reading and/or writing for a portable non-volatile recording medium of various standards such as flash memory, or the like may be connected to the bus. A program in which the processing contents of the respective functional modules exemplified above have been described is held in the secondary storage apparatus such as a flash memory through a recording medium such as a CD or DVD or a communication unit such as a network and installed into a computer. The functional module group exemplified above may be realized by a program stored in the secondary storage apparatus being read to a RAM and being executed by a microprocessor such as a CPU. Further, some of the functions of the management apparatus 10, the interpreter 20, and the printing control apparatus 30 may be implemented as a hardware circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing management apparatus comprising:
an assignment unit that assigns respective pages, on a page unit basis, to be interpreted among pages of print data, to a plurality of interpreters that each interpret print data to generate interpretation result data, so as to be interpreted;
a failure detector that detects a failure of the interpreters; and
a reassignment unit that reassigns pages, among the print data, assigned to a failed interpreter which is detected by the failure detector to a remaining interpreter other than the failed interpreter, among the plurality of interpreters, so as to be interpreted,
wherein the plurality of interpreters transmit interpretation result data corresponding to logical pages of the print data obtained by interpreting the respective pages assigned by the assignment unit to one printing control apparatus, and the printing control apparatus causes a printing apparatus to perform printing in accordance with the interpretation result data received from the plurality of interpreters.

2. The printing management apparatus according to claim 1,
wherein when the failure detector detects a failure of any of the interpreters, the reassignment unit acquires print completion information indicating pages printed by the printing apparatus from the printing control apparatus and excludes the printed pages indicated by the acquired print completion information from pages of the print data to be reassigned.

3. The printing management apparatus according to claim 2,
wherein when the failure detector detects a failure of any of the interpreters, the reassignment unit borrows at least one of interpreters corresponding to a separate print management apparatus from the separate print management apparatus, and performs reassignment to the borrowed interpreter.

4. The printing management apparatus according to claim 3,
wherein only when interpretation result data is not able to be supplied so as to be adjusted to a print speed of the printing apparatus by the remaining interpreter other than the failed interpreter among the plurality of interpreters, the reassignment unit borrows an interpreter from the separate print management apparatus.

5. The printing management apparatus according to claim 1,
wherein when the failure detector detects a failure of any of the interpreters, the reassignment unit borrows at least one of interpreters corresponding to a separate print management apparatus from the separate print management apparatus, and performs reassignment to the borrowed interpreter.

6. The printing management apparatus according to claim 5,
wherein only when interpretation result data is not able to be supplied so as to be adjusted to a print speed of the printing apparatus by the remaining interpreter other than the failed interpreter among the plurality of interpreters, the reassignment unit borrows an interpreter from the separate print management apparatus.

7. The printing management apparatus according to claim 1, wherein the printing control apparatus controls the printing apparatus to print a plurality of the logical pages per physical page according to a user setting.

8. The printing management apparatus according to claim 1, wherein the plurality of interpreters each generate the intermediate result data having a format with an intermediate size between a size of the print data assigned by the assignment unit and a size of print image data printed by the printing apparatus.

9. A non-transitory computer readable medium storing a program that causes a computer to function as:
- an assignment unit that assigns respective pages, on a page unit basis, to be interpreted among pages of print data, to a plurality of interpreters that each interpret print data to generate interpretation result data, so as to be interpreted;
- a failure detector that detects a failure of the interpreters; and
- a reassignment unit that reassigns pages, among the print data, assigned to a failed interpreter which is detected by the failure detector to a remaining interpreter other than the failed interpreter, among the plurality of interpreters, so as to be interpreted.

10. A printing system comprising:
- a plurality of interpreters that each interpret print data to generate interpretation result data; and
- a printing management apparatus,
- wherein the printing management apparatus includes:
  - an assignment unit that assigns respective pages, on a page unit basis, to be interpreted among pages of print data, to the interpreters so as to be interpreted;
  - a failure detector that detects a failure of the interpreters; and
  - a reassignment unit that reassigns pages, among the print data, assigned to a failed interpreter which is detected by the failure detector to a remaining interpreter other than the failed interpreter, among the plurality of interpreters, so as to be interpreted, and
- wherein the plurality of interpreters transmit interpretation result data corresponding to logical pages of the print data obtained by interpreting the respective pages assigned by the assignment unit to one printing control apparatus, and the printing control apparatus causes a printing apparatus to perform printing in accordance with the interpretation result data which is received from the plurality of interpreters.

11. The printing system according to claim 10, further comprising:
- the printing control apparatus,
- wherein the printing control apparatus controls the printing apparatus to print a plurality of the logical pages per physical page according to a user setting.

12. The printing system according to claim 10, wherein the plurality of interpreters each generate the intermediate result data having a format with an intermediate size between a size of the print data assigned by the assignment unit and a size of print image data printed by the printing apparatus.

* * * * *